(No Model.) 3 Sheets—Sheet 1.
W. GRIESSER.
GRAIN DRYING APPARATUS.
No. 536,785. Patented Apr. 2, 1895.
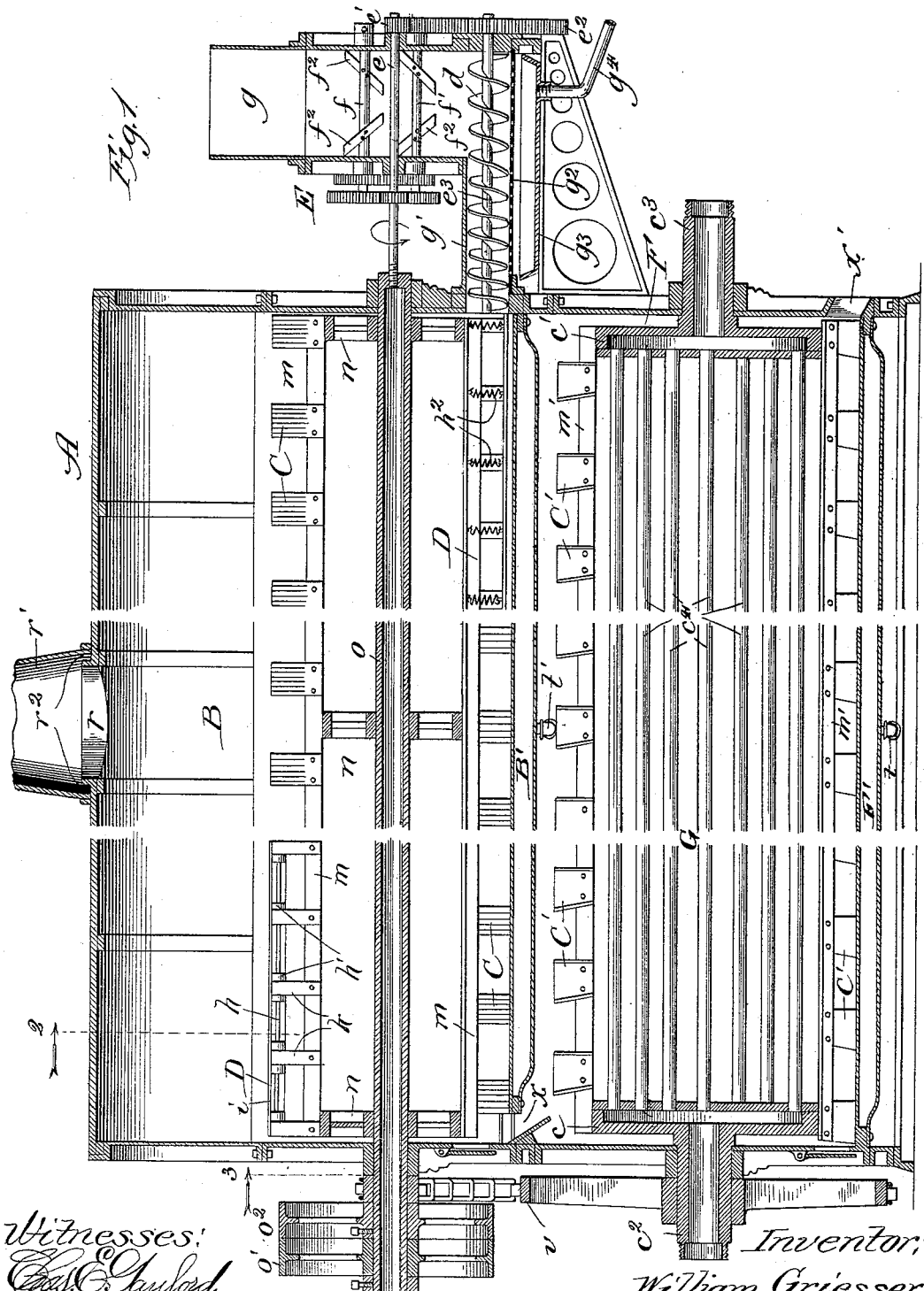
Witnesses:
Chas. E. Taylord
Lute J. Alter
Inventor:
William Griesser,
By Dyrenforth & Dyrenforth
Atty's

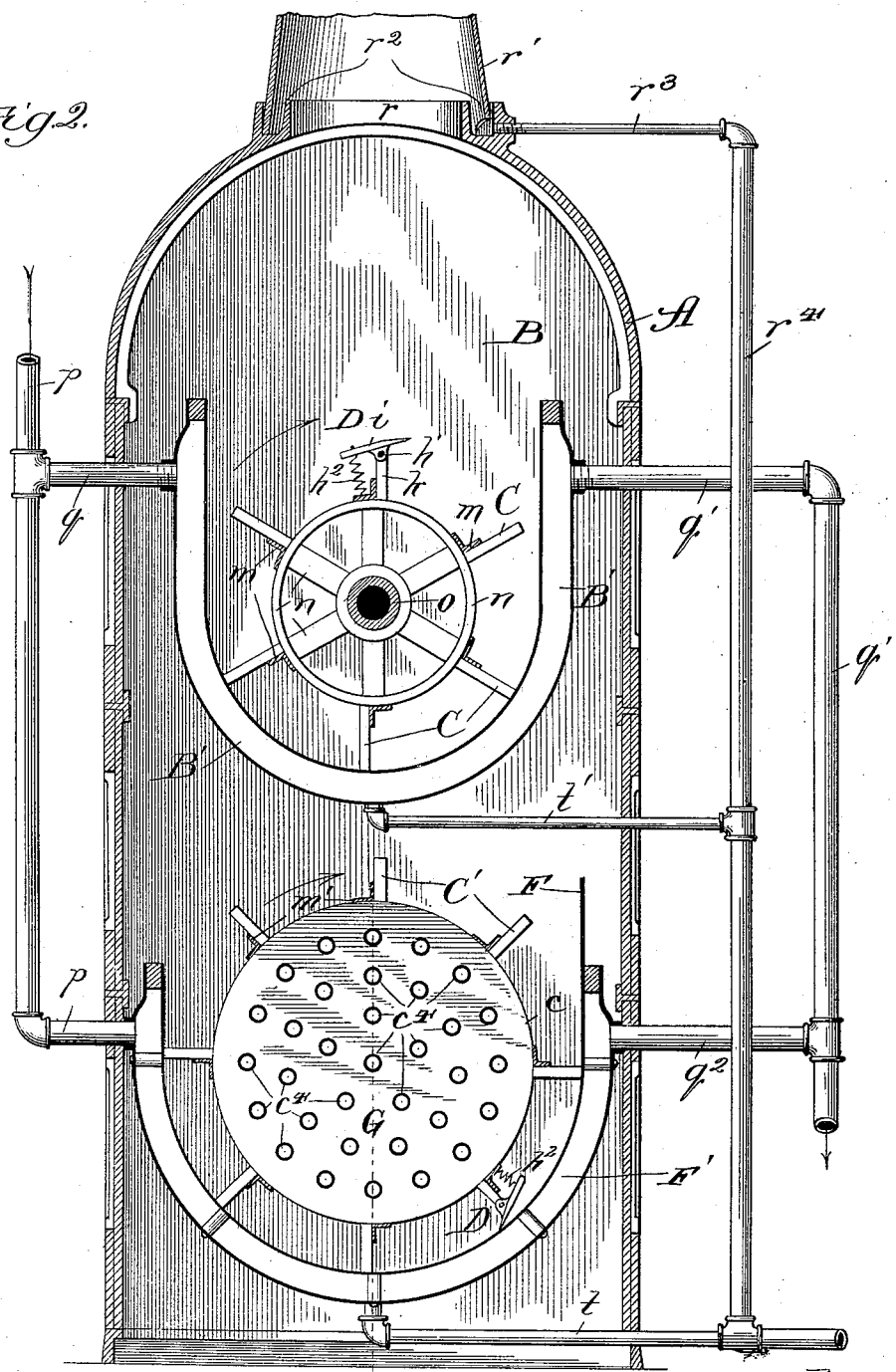

(No Model.) 3 Sheets—Sheet 3.
W. GRIESSER.
GRAIN DRYING APPARATUS.
No. 536,785. Patented Apr. 2, 1895.
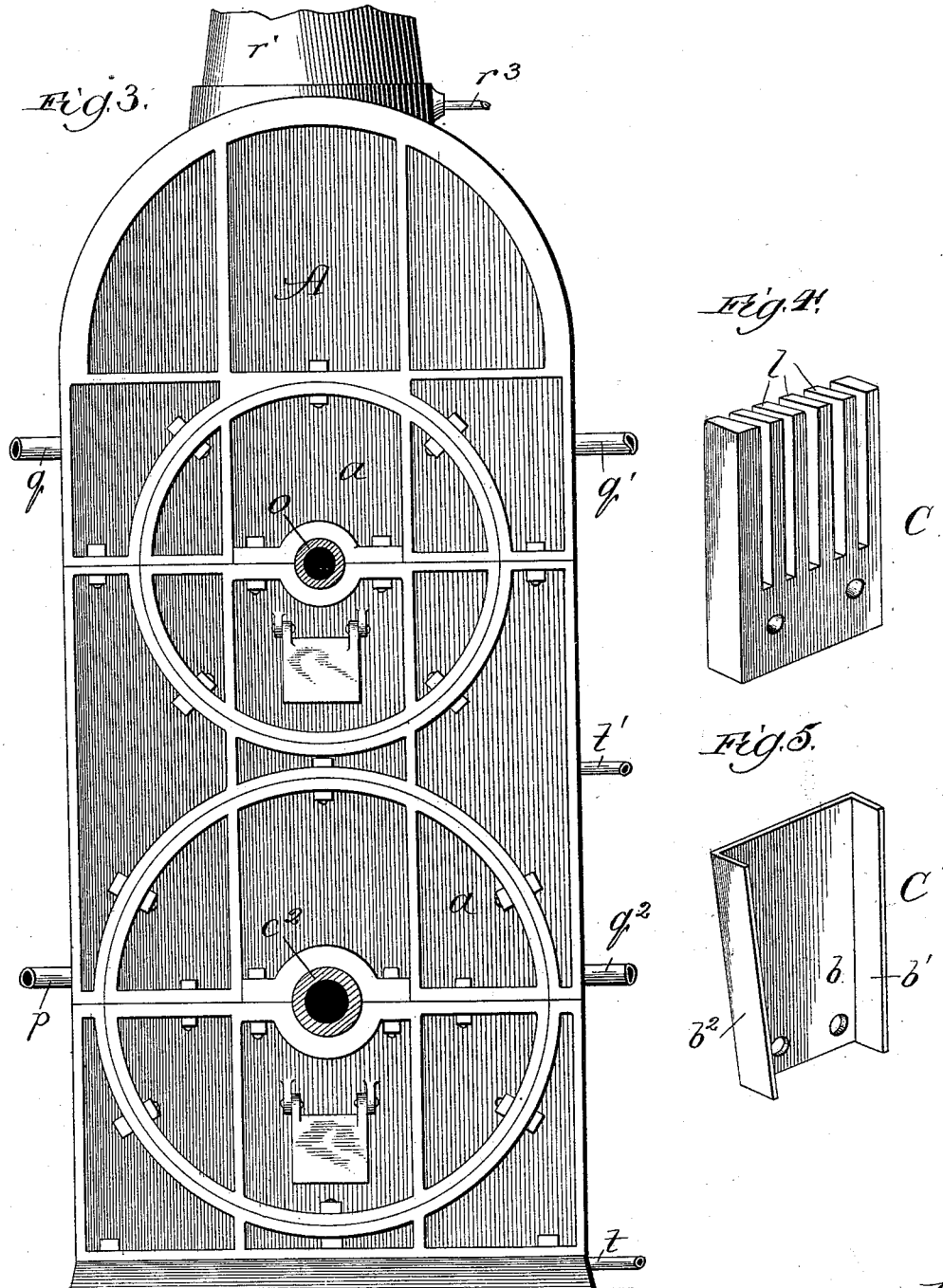
Witnesses:
Inventor:
William Griesser,
By Dyrenforth & Dyrenforth,
Attys

UNITED STATES PATENT OFFICE.

WILLIAM GRIESSER, OF CHICAGO, ILLINOIS.

GRAIN-DRYING APPARATUS.

SPECIFICATION forming part of Letters Patent No. 536,785, dated April 2, 1895.

Application filed November 14, 1894. Serial No. 528,773. (No model.)

*To all whom it may concern:*

Be it known that I, WILLIAM GRIESSER, a citizen of the United States, residing at Chicago, in the county of Cook and State of Illinois, have invented a new and useful Improvement in Grain-Drying Apparatus, of which the following is a specification.

My invention relates to an improvement in the class of apparatus used for drying brewers' grains, brewers' spent hops, distillers' slops and the like.

My object is to provide a construction of grain-drying apparatus improved in matters of detail.

My improvement is illustrated in the accompanying drawings, in which—

Figure 1 is a broken view in sectional elevation, the section being taken at the line 1 on Fig. 2 and viewed in the direction of the arrow, but showing only such parts as are presented in a vertical plane, to avoid the confusion that would ensue were parts behind those presented in the vertical plane also represented. Fig. 2 is a section taken at the line 2 on Fig. 1 and viewed in the direction of the arrow. Fig. 3 is a section taken at the line 3 on Fig. 1 and viewed in the direction of the arrow; and Figs. 4 and 5 are perspective views of different shovel details.

Generally stated, my improved apparatus involves the following described construction: The mass of material to be dried is introduced into the machine through the medium of a feed-conveyer regulated to feed according to the capacity of the machine. This feed-conveyer involves a perforated shell through which to permit a large portion of the moisture to run off instead of allowing it to enter the drying-machine; the conveyer being of the worm variety and having the spaces between its blades narrowed toward the discharge end. From the conveyer the material, freed from a considerable portion of its moisture, enters a steam heated trough or chamber containing revolving shovel and scraper devices of peculiar construction, and from which it is discharged into a lower steam heated chamber containing a revolving drum formed with steam pipes and carrying shovels and scrapers of peculiar construction. From the last-named drum, the material, if sufficiently dried, may be discharged from the apparatus; or if it requires to be further dried, the discharge may be into another drying-drum, or successively into any number of drying-drums of the same construction as that herein represented, or of any other desired construction.

The inclosing case of the apparatus has its ends formed in readily removable sections to afford convenient access to the inclosed apparatus and permit of its being conveniently removed when desired.

The following is a detailed description of my improved machine:

A is the inclosing-case, formed preferably of sheet-metal and wood, the width and length of the case being such as to conveniently accommodate the apparatus which it is designed to contain; and in the crown of the case is an outlet opening $r$ for the steam and vapors, provided with a stack $r'$ extending from a trough $r^2$ surrounding the opening $r$ and from which there leads a discharge-pipe $r^3$ to carry the water of condensation off through a manifold $r^4$.

In the upper portion of the case A is supported a trough or chamber B surrounded by a steam-jacket B' into which steam is fed through a branch-pipe $q$ from a source of steam supply (not shown) from which the pipe $p$ leads; and a discharge-pipe $q'$ for the steam leads from the jacket B'. In the opposite ends of the case A is journaled a rotary-shaft $o$, preferably hollow as shown, and carrying at its outer end the belt-pulleys $o'$ and $o^2$ at which to gear it with the drive power (not shown). At intervals on the shaft $o$ are provided, to rotate with it, circular heads $n$, affording bearings for angle-irons $m$, or bearing-bars, provided at intervals about the heads, to which they are fastened, and extending lengthwise of the shaft $o$.

At suitable intervals along each angle-iron $m$ are fastened shovels C of peculiar construction, which is best illustrated in Fig. 4, showing a rectangular block, preferably of metal, formed with comb-like inclining rigid teeth $l$. On each angle-iron $m$ is also provided a scraper-device D of peculiar construction, described as follows: Short bars $k$ are riveted or otherwise fastened, at suitable intervals apart, to the angle-iron to extend at a right-angle thereto, and carry at their outer ends a scraper-blade $i$ pivoted to the bars $k$ by means of a rod $h$ passed through them and through lugs $h'$ on the blade $i$ adjacent to the bars. The blade $i$ is controlled to bear resiliently against the inner side of the chamber B, when brought into contact therewith by the rotation of the shaft $o$, through the medium of the springs $h^2$ connecting the blade near its rear edge with the angle iron adjacent to each bar $k$.

The series of shovels C and scrapers D are preferably so arranged relatively, that the scrapers form, as it were, a spiral series about the shaft $o$. Thus, as will be seen on inspection of Fig. 2, six of the angle-irons $m$ are provided at equal intervals about the heads $n$; and the aggregate length of the sections of scraper D corresponds with the distance between the extreme heads $n$, but it is divided up into six parts, one of which is fastened to each angle iron to afford the spiral arrangement hereinbefore referred to by causing the end of one on one angle-iron to reach to or about to the plane of the end of another on the next adjacent angle iron, and so on throughout the series of angle-irons.

E is the feed comprising a hopper $g$ opening at its base into a conveyer chamber $g'$ provided with a perforated bottom $g^2$. The hopper also contains rotary shafts $f$ and $f'$ carrying stirrer-blades $f^2$, these shafts being geared together, as shown in Fig. 1, and with a drive-shaft $e$, journaled in the opposite sides of the hopper, and fastened at one end to the shaft $o$ and carrying, at its opposite end, a pinion $e'$ meshing with a gear $e^2$ on the shaft $e^3$ of the conveyer $d$ in the chamber $g'$. Toward the end of the conveyer $d$ nearest the chamber B, the spaces between the sections of the spiral flange or conveyer blade are gradually reduced for the purpose of affording a tendency in the conveyer to compress the more the material upon which it is operating and thereby express therefrom the greater amount of water, which passes off through the perforated bottom $g^2$ of the conveyer-chamber $g'$ into a pan $g^3$, from which it discharges through an outlet pipe $g^4$. The conveyer $d$ feeds the mass of material, from which a large portion of its water has thus been removed, into one end of the chamber B, wherein it is subjected to the heat supplied through the medium of the steam-jacket B' and thoroughly agitated and conveyed toward the opposite discharge-end of the chamber by the rotation of the shaft $o$ and action of the shovels C and scrapers D. The inclination of the teeth on the shovels tends to carry the material being dried toward the discharge end of the chamber B, and their construction also tends to cut and break it up and prevent it from balling or caking; and the scrapers D, by acting against the inner surface of the chamber, keep the latter clear from adherence to it of the material, and thus from obstructing the radiation of heat from it, whereby impairment of its heating capacity is avoided.

Below the chamber B is supported a similar, preferably trough-shaped, chamber F, surrounded by a steam-jacket F' into which the steam supply pipe $p$ leads and from which the steam discharges through a branch $q^2$ leading into the discharge-pipe $q'$; and the water of condensation is drawn off through a pipe $t$ leading into the manifold $r^4$, into which also a pipe $t'$, for a purpose similar to that of the pipe $t$, leads from the base of the jacket B'.

Within the chamber F is journaled a drum G comprising hollow heads $c$ and $c'$ formed with hollow trunnions $c^2$ and $c^3$ and connected by steam-pipes $c^4$ opening at their opposite ends into the chambers afforded by the hollow heads $c$ and $c'$. At intervals, about the heads $c$ and $c'$, are supported, to extend lengthwise of the drum, the angle-irons $m'$, each carrying at intervals shovels C'. The construction of the shovels C' will be best understood by inspection of the one illustrated in Fig. 5, showing a blade $b$ provided on its lateral edges with flanges $b'$ and $b^2$, the former being inclined to cause the shovel to flare toward one side from its lower to its upper end. The shovels C' are so set on the drum G as to cause them, in the rotation of the latter, to impel the material undergoing the drying operation, which is fed to it through the discharge opening $x$ from the chamber B, toward the discharge outlet $x'$ from the chamber F. In addition to the shovels C', I prefer to provide also, on the drum G, scrapers D as shown in Fig. 2, and the best arrangement for which, with relation to the shovels C', is that described of the scrapers in the chamber B with relation to the shovels C therein.

The drum G is driven through the medium of a sprocket-wheel $v$ on its trunnion $c^2$, geared to the shaft $o$ as illustrated in Fig. 1; and the steam for heating the drum enters the tubes $c^4$ at the trunnion $c^3$, and discharges from them by way of the trunnion $c^2$.

The shaft $o$ and the trunnions of the drum G are journaled in the opposite ends of the casing A which, as most clearly shown in Fig. 3, are formed in removable sections, which may best be compared, for the purpose of explanation, with the top of a cook-stove with the round lid-portions $a$ formed in halves, with flanged semi-circular openings to afford the journal bearings, and being circumferentially flanged to meet flanges on the edges of the sections in which they fit and to which they are fastened by bolting through the flanges. With this construction, to obtain access to the interior of either chamber B or F, it is a comparatively easy matter to remove either section of a plate $a$; and on removing both sections of either, the entire drum G, or the shaft $o$ with all the parts it carries, as the case may be, can be removed by withdrawal.

The opening $x'$ may, as hereinbefore suggested, be the ultimate discharge opening of the apparatus; or it may lead to another chamber or series of chambers like the chamber F and similarly equipped, if desired.

What I claim as new, and desire to secure by Letters Patent, is—

1. In a grain-drying apparatus, in combination with a heated chamber for the material to be dried, means in the chamber for stirring the material, comprising a rotary shaft carrying at intervals about its circumference shovels C each formed with a series of rigid inclined teeth $l$, substantially as described.

2. In a grain-drying apparatus, in combination with a heated chamber for the material to be dried, means in the chamber for stirring the material, comprising a rotary shaft carrying, at intervals, heads $n$, bearing-bars $m$ supported at intervals about the heads to extend lengthwise of the shaft and carrying series of shovels C each formed with a series of rigid inclined teeth $l$, substantially as described.

3. In a grain-drying apparatus, in combination with a heated chamber for the material to be dried, means in the chamber for stirring the material and scraping it from the sides of the chamber, comprising a rotary shaft carrying, at intervals, heads $n$, bearing-bars $m$ supported at intervals about the heads to extend lengthwise of the shaft and carrying series of shovels and series of scrapers D arranged in spiral relation about the shaft and each comprising a spring-controlled blade $i$ pivotally connected with the bars $k$ extending from a bearing-bar, substantially as described.

4. In a grain-drying apparatus, in combination with a heated chamber for the material to be dried, a drum in said chamber, angle-irons extending at intervals about the drum lengthwise thereof, and scrapers D each comprising bars $k$ fastened to an angle-iron and carrying at their outer ends a pivotal spring-controlled scraper-blade $i$, substantially as described.

5. In a grain-drying apparatus, in combination with an upper heated chamber for the material to be dried and containing means for stirring said material, a lower heated chamber into which the upper chamber discharges and containing a drum G formed with heads connected by tubes through which a heating medium is passed, angle-irons extending at intervals about the drum lengthwise thereof, series of shovels C' fastened to the angle-irons, and scrapers D each comprising bars $k$ fastened to an angle-iron and carrying at their outer ends a pivotal spring-controlled scraper-blade $i$ substantially as described.

WILLIAM GRIESSER.

In presence of—
 M. J. FROST,
 J. H. LEE.